United States Patent
Peng et al.

(10) Patent No.: US 11,334,982 B2
(45) Date of Patent: May 17, 2022

(54) METHOD FOR DEFECT CLASSIFICATION, METHOD FOR TRAINING DEFECT CLASSIFIER, AND APPARATUS THEREOF

(71) Applicants: Beijing BOE Optoelectronics Technology Co., Ltd., Beijing (CN); BOE Technology Group Co., Ltd., Beijing (CN)

(72) Inventors: Xiangjun Peng, Beijing (CN); Yunqi Wang, Beijing (CN); Chenxi Zhao, Beijing (CN); Yachong Xue, Beijing (CN); Gang Li, Beijing (CN); Yaoyu Lv, Beijing (CN); Shuo Zhang, Beijing (CN); Minglei Chu, Beijing (CN); Lili Chen, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 12 days.

(21) Appl. No.: 16/859,332

(22) Filed: Apr. 27, 2020

(65) Prior Publication Data

US 2021/0027454 A1 Jan. 28, 2021

(30) Foreign Application Priority Data

Jul. 24, 2019 (CN) .......................... 201910670824.2

(51) Int. Cl.
*G06T 7/00* (2017.01)
(52) U.S. Cl.
CPC .. *G06T 7/0004* (2013.01); *G06T 2207/20081* (2013.01); *G06T 2207/30121* (2013.01)

(58) Field of Classification Search
CPC ......... G06T 7/0004; G06T 2207/20081; G06T 2207/30121; G06T 7/11; G06T 7/136;
(Continued)

(56) References Cited

U.S. PATENT DOCUMENTS 5,799,104 A * 8/1998 Nakamura ................. G03F 1/26
250/492.2
6,104,835 A * 8/2000 Han ....................... G06K 9/6274
382/159
(Continued)

FOREIGN PATENT DOCUMENTS

CN 106934401 A 7/2017
CN 109084955 A 12/2018
(Continued)

OTHER PUBLICATIONS

Apr. 30, 2021—(CN) First Office Action Appn 201910670824.2 with English Translation.

*Primary Examiner* — Sheela C Chawan
(74) *Attorney, Agent, or Firm* — Banner & Witcoff, Ltd.

(57) ABSTRACT

The disclosure provides a method for defect classification, including: extracting a low-level feature of a defect region from a defect image; encoding the low-level feature by using a defect dictionary to obtain a middle-level semantic feature corresponding to the low-level feature; classifying a defect in the defect region of the defect image into one of a plurality of defect categories based on the middle-level semantic feature, wherein the defect dictionary includes a defect intra-category dictionary and a defect inter-category dictionary.

14 Claims, 8 Drawing Sheets

(58) Field of Classification Search
CPC ........... G06T 5/002; G06T 2207/20024; G06T 2207/20036; G06K 9/4676; G06K 9/6218; G06K 9/6256; G06K 9/6269; G06F 17/16
USPC ....... 382/100, 141, 145, 149, 181, 224, 159, 382/155; 702/1, 33, 35; 356/237.1, 356/237.2, 237.5, 388, 398, 390; 700/90, 700/95, 117, 121, 108, 109, 110
See application file for complete search history.

(56) References Cited

U.S. PATENT DOCUMENTS

| | | | | |
|---|---|---|---|---|
| 2007/0230770 | A1* | 10/2007 | Kulkarni | ........... H01L 21/67005 382/149 |
| 2007/0288219 | A1* | 12/2007 | Zafar | .................... G06T 7/0008 703/14 |
| 2011/0054659 | A1* | 3/2011 | Carlson | ............. H01L 21/67253 700/109 |
| 2014/0270347 | A1* | 9/2014 | Xu | .......................... G06T 7/001 382/103 |
| 2015/0228063 | A1* | 8/2015 | Minakawa | ............... G06K 9/52 382/151 |
| 2020/0151869 | A1* | 5/2020 | Hu | ........................ G06T 7/0004 |

FOREIGN PATENT DOCUMENTS

| | | |
|---|---|---|
| CN | 109509170 A | 3/2019 |
| CN | 109858570 A | 6/2019 |

* cited by examiner

METHOD FOR DEFECT CLASSIFICATION, METHOD FOR TRAINING DEFECT CLASSIFIER, AND APPARATUS THEREOF

CROSS-REFERENCE TO RELATED APPLICATION

The application claims priority to Chinese patent application No. 201910670824.2 filed on Jul. 24, 2019. For all purposes under the U.S. law, the entire disclosure of the aforementioned application is incorporated by reference as part of the disclosure of this application.

TECHNICAL FIELD

The present disclosure relates to a method for defect classification, a method for training a defect classifier, and apparatus thereof, in particular, to a method for defect classification, a method for training a defect classifier, and apparatus thereof based on a middle-level semantic feature.

BACKGROUND

At present, LED screens, OLED screens and liquid crystal display screens are widely used in the display screens of display devices. However, due to the limitations of semiconductor technology and man-made operation errors and other factors, various defects occur on the produced screens. Therefore, in the current production process of screens, the screens are inspected before leaving the factory, and defect screens need to be detected for further analysis and inspection, so as to ensure the quality of products (e.g., screens) leaving the factory.

SUMMARY

According to an aspect of the present disclosure, there is provided a method for defect classification, comprising: extracting a low-level feature of a defect region from a defect image; encoding the low-level feature by using a defect dictionary to obtain a middle-level semantic feature corresponding to the low-level feature; classifying a defect in the defect region of the defect image into one of a plurality of defect categories based on the middle-level semantic feature, wherein the defect dictionary includes a defect intra-category dictionary and a defect inter-category dictionary.

According to an embodiment of the present disclosure, the defect intra-category dictionary includes a plurality of secondary defect intra-category dictionaries each respectively corresponding to one of the plurality of defect categories, and each secondary defect intra-category dictionary is directed to low-level features specific to its corresponding defect category; and the defect inter-category dictionary is directed to low-level features that the plurality of defect categories have in common.

According to an embodiment of the present disclosure, the defect inter-category dictionary is obtained by clustering low-level features of all defect regions of all defect images in a predetermined set of defect images; each secondary defect intra-category dictionary is obtained by clustering low-level features of all defect regions, each having a defect belonging to the defect category corresponding to the secondary defect intra-category dictionary, in all defect images in the predetermined set of defect images; the defect intra-category dictionary is obtained by combining the plurality of secondary defect intra-category dictionaries; and the defect dictionary is obtained by combining the defect inter-category dictionary and the defect intra-category dictionary.

According to an embodiment of the present disclosure, the extracting low-level features of the defect region from the defect image comprises: performing an image segmentation on the defect image to extract the defect region; and extracting the low-level feature of the defect region.

According to an embodiment of the present disclosure, the low-level feature includes: a Histogram of Oriented Gradient feature, a Scale-invariant Feature Transform feature, or a Speed-up Robust feature.

According to an embodiment of the present disclosure, the encoding the low-level feature by using the defect dictionary to obtain the middle-level semantic feature corresponding to the low-level feature comprises: encoding the low-level feature, by using the following formula, based on the defect dictionary, to obtain a feature encoding matrix corresponding to the low-level feature:

$$\min_{V} \sum_{i=1}^{p} \|x_i - Uv_i\|_2^2 + \lambda \|v_i\|_1$$

where, V represents the feature encoding matrix, $\|\cdot\|_2^2$ represents a square of 2-norm of a vector and corresponds to a sum of a square of each element in the vector; $\mu \cdot \|_1$ represents a 1-norm of a vector and corresponds to a sum of an absolute value of each element in the vector; p is a number of feature regions of the defect region; $x_i$ is a low-level feature vector of a single feature region i ($1 \le i \le p$) of the defect region; U is a matrix of the defect dictionary; $v_i$ is a weight vector corresponding to $x_i$, and a number p of $v_i$ constitute the feature encoding matrix V; $\lambda \|v_i\|_1$ is a constraint condition such that the sum of the absolute value of each element in the vector $v_i$ will not be too large; and obtaining the middle-level semantic feature based on the feature encoding matrix, wherein, the feature encoding matrix V enables a minimum value of the above formula.

According to an embodiment of the present disclosure, the middle-level semantic feature includes a Bag-of-Words model, and the encoding the low-level feature by using the defect dictionary to obtain the middle-level semantic feature corresponding to the low-level feature further comprises: obtaining the Bag-of-Words model of the defect region according to the feature encoding matrix V.

According to an embodiment of the present disclosure, the plurality of defect categories include: dark spot, bright spot, scratch, glass breakage, liquid leakage, and poor film, and the classifying the defect in the defect region of the defect image into one of the plurality of defect categories comprises: classifying the defect in the defect region of the defect image into one of dark spot, bright spot, scratch, glass breakage, liquid leakage, and poor film.

According to an embodiment of the present disclosure, the classifying the defect in the defect region of the defect image into one of the plurality of defect categories based on the middle-level semantic features comprises: inputting the obtained middle-level semantic feature of the defect region of the defect image into a trained classifier for classification.

According to another aspect of the present disclosure, there is provided a method for training a defect classifier, comprising: extracting low-level features of all defect regions from all defect images in a predetermined set of defect images, wherein a defect category of a defect in each defect region is known; constituting a defect dictionary based on low-level features of all defect regions; encoding a low-level feature of each defect region by using the defect dictionary, to obtain a middle-level semantic feature of the defect region corresponding to the low-level feature of the defect region; and training the classifier based on the obtained middle-level semantic feature of each defect region and the defect category of the defect in the defect region, wherein the defect dictionary comprises a defect intra-category dictionary and a defect inter-category dictionary.

According to an embodiment of the present disclosure, the defect intra-category dictionary includes a plurality of secondary defect intra-category dictionaries each respectively corresponding to one of a plurality of defect categories, and each secondary defect intra-category dictionary is directed to low-level features specific to its corresponding defect category; and the defect inter-category dictionary is directed to low-level features that the plurality of defect categories have in common.

According to an embodiment of the present disclosure, the constituting the defect dictionary based on low-level features of all defect regions comprises: clustering low-level features of all defect regions of all defect images in the predetermined set of defect images to obtain the defect inter-category dictionary; for each defect category, clustering low-level features of all defect regions each having a defect belonging to the defect category in all defect images in the predetermined set of defect images, to obtain a corresponding secondary defect intra-category dictionary; combining a plurality of secondary defect intra-category dictionaries to obtain defect intra-category dictionaries; and combining the defect inter-category dictionary and the defect intra-category dictionary to obtain the defect dictionary.

According to an embodiment of the present disclosure, the extracting low-level features of the defect region from each defect image in a predetermined set of defect images comprises: for each defect image: performing an image segmentation on the defect image to extract a defect region; and extracting the low-level feature of the defect region.

According to an embodiment of the present disclosure, the defect category includes: dark spot, bright spot, scratch, glass breakage, liquid leakage, or poor film.

According to yet another aspect of the present disclosure, there is provided an apparatus for defect classification, comprising: a processor; and a memory for storing computer-executable instructions that, when executed by the processor, cause the possessor to perform the method for defect classification described above.

According to yet another aspect of the present disclosure, there is provided an apparatus for training a defect classifier, comprising: a processor; and a memory for storing computer-executable instructions that, when executed by the processor, cause the possessor to perform the method for training defect classifier described above.

DETAILED DESCRIPTION

The technical solution in the embodiment of the present disclosure will be described clearly and completely below with reference to the drawings in the embodiment of the present disclosure. Obviously, the described embodiments are only part of embodiments of the present disclosure, not all embodiments. Based on the embodiments of the present disclosure, all other embodiments obtained by those of ordinary skill in the art without inventive labor are within the protection scope of the present disclosure.

In an actual production process of screens, not only screen defects need to be detected, but also defect categories of the screen defects need to be counted, for analyzing the causes of the screen defects, so as to improve the industrial production method and the yield of screen production.

There are many defect categories for screen defects. For screen defects of a same defect category, when factors such as camera parameters, shooting methods, and shooting environment change, the attributes (such as geometry, texture, shape, local descriptors, etc.) in images of the same screen defect will also change. Screen defects have very different shapes, and many similar contents exist between screen defects of different defect categories, as shown in FIG. 1.

Figure 1:
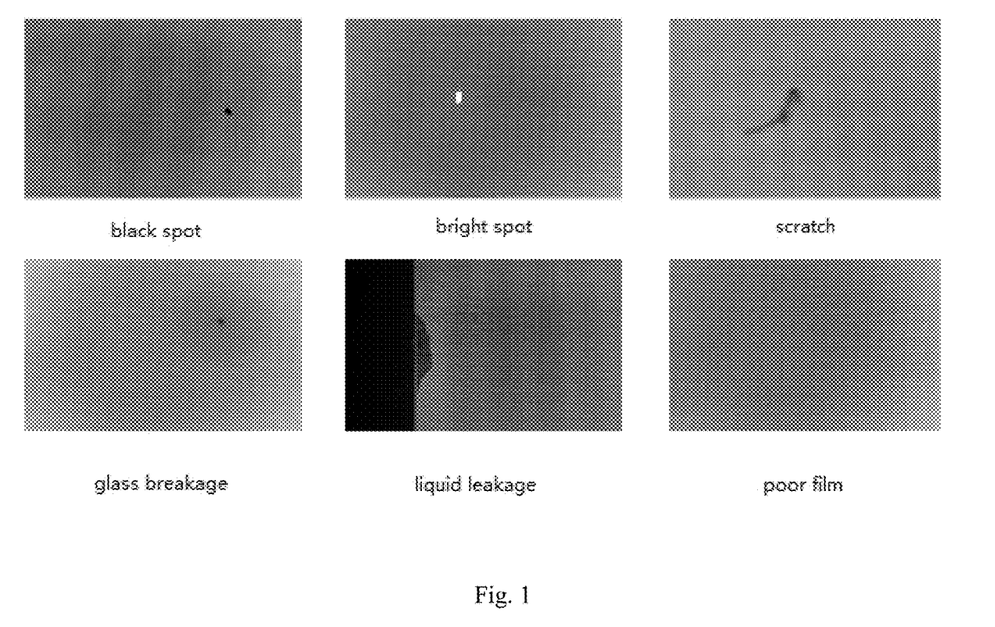
FIG. 1 shows examples of common defect categories of screen defects.

FIG. 1 shows examples of common defect categories of screen defects. Common defect categories include dark spot, bright spot, scratch, broken glass, liquid leakage, poor film, etc. However, those skilled in the art will understand that the division of screen defects is not limited to this, and the screen defects can be divided in another way. For example, according to shapes of the screen defects, the screen defects can also be divided into the following defect categories: dot defect, line defect, block defect, etc.

Generally, a camera (such as a CCD camera) is used as an image sensor to obtain a screen image. When it is detected that the screen image is a defect image, the next step should be classifying defect(s) in the defect image.

At the same time, in order to classify the defect(s) in the defect image, features of the defect(s) in the defect image need to be extracted first. Low-level features regarding attributes such as geometry, texture, shape, local descriptors are used in traditional methods for defect classification, but these low-level features are extracted based on an image-layer information without sufficient generalization and abstraction, so they are far away from a concept-layer. Therefore, the classification accuracy of defects in defect images based on these low-level features is not high, and it is difficult to identify defects outside a training set.

Based on this, the present disclosure provides a method and an apparatus for defect classification based on a middle-level semantic feature, which can reduce the influence of objective factors such as camera parameters, shooting methods, and shooting environment on classification.

In order to facilitate the understanding of the present disclosure, the middle-level semantic feature of an image is firstly briefly introduced in the following.

Middle-level semantic feature is obtained by analyzing the statistical distribution of low-level features. Types of the middle-level semantic feature mainly include a visual Bag of Words (BOW) (also referred as a Bag of Words model) and semantic themes. In image analysis, an overall statistical information of an image is applied without analyzing a specific constitution of objects in the image, which is very helpful for modeling the characteristics of the objects in the image. The Bag-of-Words model is a representation method of the middle-level semantic feature that regards the image as a document composed of visual words, thereby applying the Bag-of-Words model and related theories in the field of text classification to image understanding. Similar to the Bag-of-Words model in the field of text classification, a generation process of the Bag-of-Words model in the image field mainly includes the following steps: after extracting and clustering (e.g., by K-means) low-level features of a plurality of feature regions of each image in a set of images for training, generating one or more clustering center values as one or more visual words; constituting a visual dictionary including the one or more visual words; extracting low-level features of a plurality of feature regions of an arbitrary image, finding out visual words respectively closest to low-level feature of each feature region of the arbitrary image according to the visual dictionary, and respectively counting a frequency (number of times) of occurrences of each visual word in the arbitrary image to obtain a visual word description of the arbitrary image. That is to say, using the Bag-of-Words model in the image field, it is possible to express contents of the arbitrary image by: constituting a visual dictionary by aid of training samples, quantifying low-level features of a plurality of feature regions of the image into visual words in the visual dictionary, and expressing contents of the image with distribution histogram of visual words of the image, without analyzing and interpreting specific contents in the image.

In the embodiment of the present disclosure, when classifying a defect in a defect image by using a middle-level semantics feature represented by the Bag-of-Words model, it is necessary to obtain the Bag-of-Words model (i.e., the middle-level semantics feature) of a defect region where the defect exists in the defect image, by using a defect dictionary (visual dictionary), and then classifying the defect by a trained classifier based on the middle-level semantics feature. However, in the above-mentioned visual dictionary generation method, if most of the visual words in the visual dictionary are representing common contents of defects of different categories, and only a few visual words are used to represent different contents among defects of different defect categories, then middle-level semantic features of defects of these different defect categories will be dominated by these common contents, and small differences among middle-level semantic features of defects of different defect categories will make little contribution to the defect classification.

Therefore, in order to enlarge the differences among the middle-level semantic features of defects of different defect categories and to improve the distinguishable ability among the middle-level semantic features of defects of different defect categories when classifying defects by using the middle-level semantic features represented by the Bag-of-Words model, the present disclosure further proposes to simultaneously apply a defect intra-category dictionary and a defect inter-category dictionary in the generation process of the Bag-of-Words model, that is, to simultaneously apply the defect intra-category dictionary and the defect inter-category dictionary to encode low-level features of defects. The defect intra-category dictionary corresponds to low-level features specific to each defect category, and the defect inter-category dictionary corresponds to low-level features that all defect categories have in common.

Figure 2:
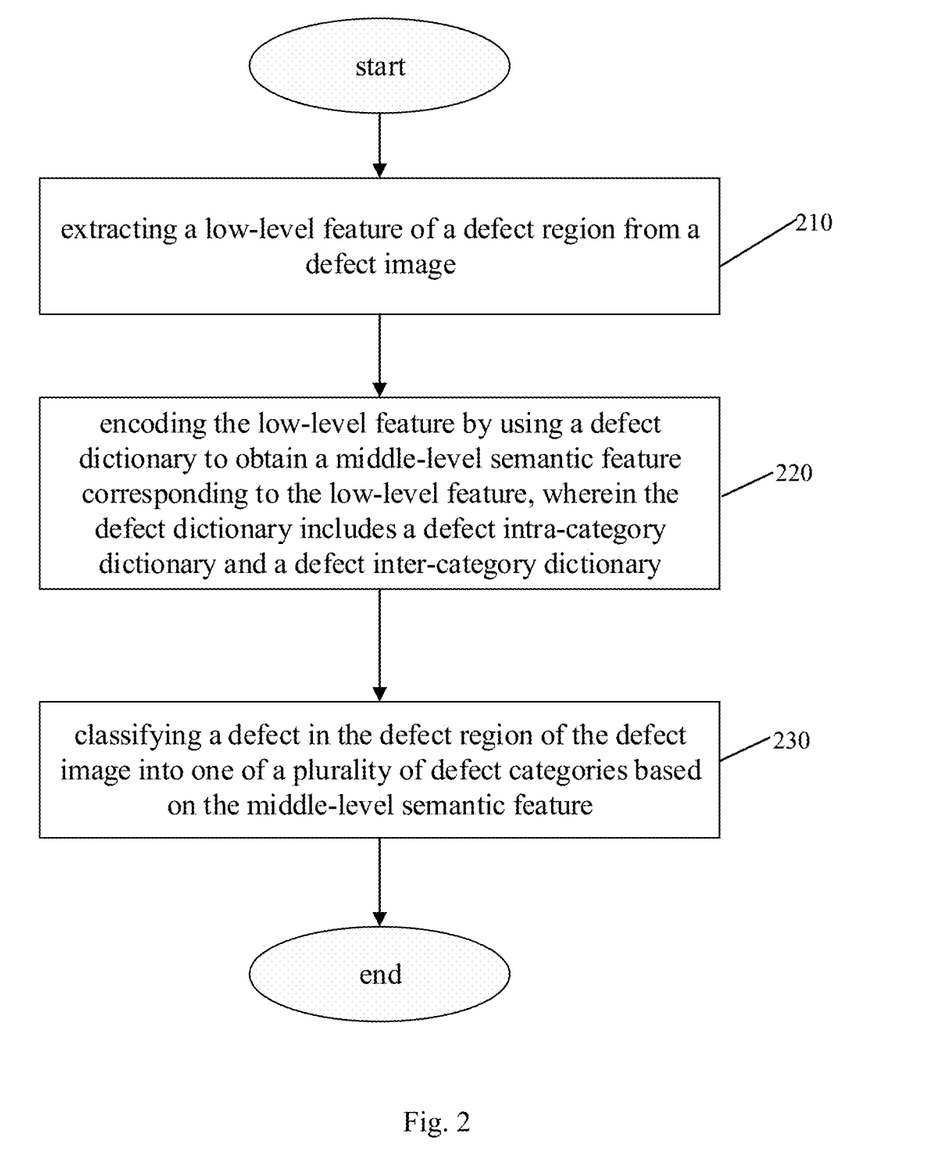
FIG. 2 shows a flowchart of a method for defect classification according to an embodiment of the present disclosure.
Figure 3:
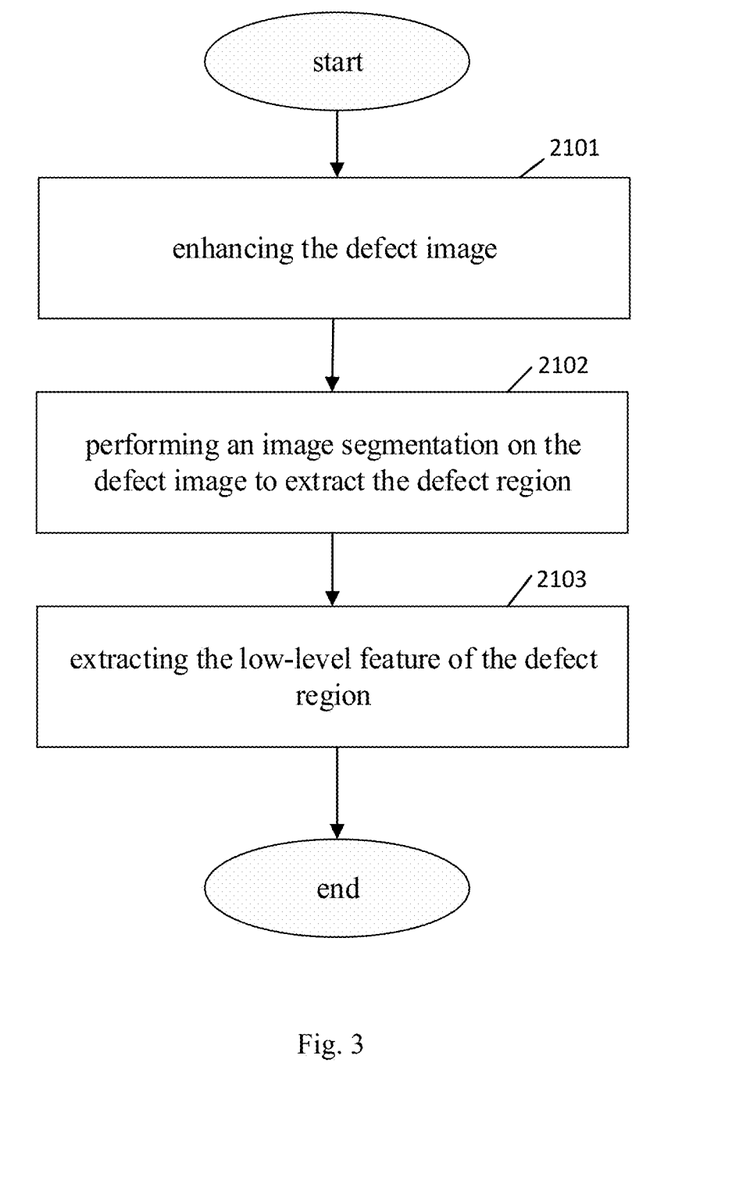
FIG. 3 shows a flowchart of a method for extracting a low-level feature of a defect region according to an embodiment of the present disclosure.

The method for defect classification provided in the present disclosure will be described in detail below with reference to FIGS. 2 and 3. FIG. 2 shows a flowchart of a method (200) for defect classification according to an embodiment of the present disclosure, and FIG. 3 shows a flowchart of a method for extracting the low-level feature of a defect region according to an embodiment of the present disclosure.

In step 210, a low-level feature of a defect region is extracted from a defect image.

The defect image refers to the detected screen image with defect(s), and the defect region refers to a region where the defect exists in the defect image. The low-level feature of the defect region is comprised of low-level features of a plurality of feature regions in the defect region, and can be represented as a Histogram of Oriented Gradient feature, a Scale-invariant Feature Transform feature, or a Speed-up Robust feature.

There may be a plurality of defect regions in one defect image, the low-level feature of each defect region can be extracted separately, each defect region can be analyzed separately, and finally a variety of defect categories can be determined for the one defect image. Therefore, even though the case where there are only one defect region in one defect image is described in detail in some embodiments later, these detailed descriptions are also applicable to the case where there are more than one defect regions in one defect image.

Optionally, referring to FIG. 3, extracting the low-level feature of the defect region from the defect image may comprise the following sub-steps.

In step 2101, the defect image is enhanced. Through this step, the influence of noise can be suppressed, and holes and isolated false points can be removed. The enhancement of the defect image comprises the following processes on the defect image sequentially: a graying process, a wavelet de-noising process, an otsu threshold segmentation, a binary expansion, a median filtering process, and a binary corrosion.

Graying the defect image refers to a process of transforming the defect image in RGB color into a gray defect image, which can greatly reduce the calculation amount of subsequent image processing while maintaining the distribution characteristics of brightness and chrominance of the defect image in RGB color. In this disclosure, a weighted average method is used to gray the defect image. Assuming that component values of three primary colors of the defect image in RGB color are denoted as R, G and B respectively, and a gray value of the transformed gray defect image is denoted as GRAY, then:

$$GRAY=0.3R+0.59G+0.11B$$

defect edges and structures) in the defect image, to improve a contrast between the defect and background, so as to highlight the defect in the defect image. The otsu threshold segmentation process is used to binarize the defect image to obtain a binary defect image. The median filtering process is used to smooth the edges of the defect in the binary defect image. The binary expansion process and the binary corrosion process are used to remove holes and isolated false points in the binary defect image.

In step 2102, an image segmentation is performed on the defect image to extract the defect region.

Optionally, by using a segmentation method of the minimum circumscribed rectangle, the minimum circumscribed rectangle of the defect is obtained by a rotation object method comprising: rotating the defect at equal intervals within the range of 90 degrees, calculating an area of a circumscribed rectangle parallel to both x coordinate axis direction and y coordinate axis direction with respect to each rotation, taking the circumscribed rectangle with the smallest area as the minimum circumscribed rectangle of the defect, and then segmenting the minimum circumscribed rectangle region (i.e., the defect region) of the defect.

In step 2103, the low-level feature of the defect region (e.g., the minimum circumscribed rectangular region) obtained in step 2102 is extracted. In the embodiment of the present disclosure, the HOG feature will be described as an example of the low-level feature, but those skilled in the art will understand that other types of low-level features are also feasible.

The HOG feature is composed of histograms of oriented gradient of a plurality of local regions of the defect region. The specific method for extracting the HOG feature of the defect region in the defect image is as follows:

1) normalizing the defect region by using a Gamma correction method, which is used to suppress noise interference, where Gamma compression formula is:

$$I(x,y)=I(x,y)^{gamma} \quad (1)$$

where I(x,y) is the minimum circumscribed rectangular region of the defect obtained in step 2102, and gamma=½;

2) respectively calculating pixel gradients in the horizontal and vertical directions of the defect region to obtain a gradient magnitude and a gradient direction at each pixel point, for capturing edge information of the defect region, where in the defect region I(x,y), the horizontal gradient at pixel point (x,y) is denoted as $G_x(x,y)$, and the vertical gradient at pixel point (x,y) is denoted as $G_y(x,y)$:

$$G_x(x,y)=I(x+1,y)-I(x-1,y) \quad (2)$$

$$G_y(x,y)=I(x,y+1)-I(x,y-1) \quad (3)$$

and the gradient magnitude and the gradient direction at pixel point (x,y) are respectively denoted as:

$$G(x, y) = \sqrt{G_x(x, y)^2 + G_y(x, y)^2} \quad (4)$$

$$\alpha(x, y) = \tan^{-1}\frac{G_y(x, y)}{G_x(x, y)}; \quad (5)$$

3) establishing a histogram of oriented gradient of each cell through the following steps: firstly dividing the defect region into cells (for example, 2*2 pixels form a cell), setting values of the gradient direction in the histogram of oriented gradient to 0-180 degrees, dividing the 0-180 degrees into bins every 20 degrees, and accumulating the gradient magnitudes of all pixels in each cell in bins to which their corresponding gradient directions respectively belong, that is, determining a weight of each gradient direction in the histogram of oriented gradient according to a corresponding magnitude of the gradient, to obtain the histogram of oriented gradient (HOG) feature of each cell.

4) grouping a predetermined number of cells into a block (e.g., 2*2 cells are grouped into a block), connecting HOG feature of all cells in one block in series to obtain a gradient intensity distribution vector, and normalizing the gradient intensity distribution vector (usually the adjacent cells overlap to a certain extent) to obtain the HOG feature of the one block, where let v denote the non-normalized gradient intensity distribution vector, the HOG feature of the one block can be obtained by applying the following normalization method:

$$L2-norm: f = \frac{v}{\sqrt{\|v\|_2^2 + e^2}} \quad (6)$$

where e is a very small constant term, such as $10^{-3}$, to avoid denominator being 0.

5) combining HOG features of all blocks in the whole defect region, to obtain the HOG feature describing the defect region.

Optionally, the combining HOG features of all blocks includes connecting the HOG feature of each block in series or connecting the HOG feature of each block in parallel.

In a feature detection method, usually a plurality of feature regions are selected in the image, and the related features of the entire image are obtained by analyzing the plurality of feature regions. For example, in the embodiments of the present disclosure, when the HOG feature is used as the low-level feature of the defect region, one local region, for example, one block (composed of a plurality of cells as described above) in the defect region can be regarded as one feature region, and the HOG feature of each block in the defect region is expressed as $x_i \in R^{D \times 1}$, D is a dimension of a feature space; then, the HOG features of a plurality of blocks in the defect region are combined (taking a parallel combination mode as an example below) to obtain a set of HOG features of the plurality of blocks (i.e., the low-level feature of the defect region) $X=[x_1, \ldots, x_p] \in R^{D \times p}$, where p is a total number of blocks (i.e., a total number of feature regions). Note that, those skilled in the art will understand that if other types of low-level features (such as SIFT and SURF features) are used, the low-level feature of the defect region can also be expressed as $X'=[x_1', \ldots, x_p'] \in R^{D \times p}$, where p is a total number of blocks (i.e., a total number of feature regions).

In step 220, the low-level feature of the defect region obtained in step 210 is encoded using a defect dictionary, to obtain a middle-level semantic feature corresponding to the low-level feature.

Optionally, a defect dictionary is constructed based on a predetermined set of defect images for training in a training phase. The constituted defect dictionary comprises a defect intra-category dictionary and a defect inter-category dictionary, wherein the defect intra-category dictionary includes a plurality of secondary defect intra-category dictionaries each respectively corresponding to one of the plurality of defect categories, and each secondary defect intra-category dictionary is directed to low-level features specific to its corresponding defect category; and the defect inter-category dictionary is directed to low-level features that the plurality of defect categories have in common. The constitution method of the defect dictionary will be described in further detail later.

Optionally, the middle-level semantic feature include a Bag-of-Words model.

Optionally, when encoding the low-level feature of the defect region $X=[x_1, \ldots, x_p] \in R^{D \times p}$, each low-level feature vector (representing the low-level feature of each block/feature region) in the low-level feature of the defect region $X=[x_1, \ldots, x_p] \in R^{D \times p}$ is quantized into one visual word to which an euclidean distance from the low-level feature vector is the minimum according to the nearest neighbor criterion, and a feature encoding matrix V is obtained, where the low-level feature vector of a feature region i ($1 \le i \le p$) of the defect region is represented by $x_i \in R^{D \times 1}$, and p is a number of feature regions of the defect region. The feature encoding matrix V is obtained by using Equation (7):

$$\min_{V} \|X - UV\|_2^2, \qquad (7)$$
$$\text{s.t.} \quad \|v_i\|_0 = \|v_i\|_1 = 1$$

where, $\|\bullet\|_2^2$ represents a square of 2-norm of a vector or a matrix, and corresponds to an absolute value of the maximum eigenvalue of the matrix in this encoding method; $\|\bullet\|_1$ represents a 1-norm of a vector or a matrix, and corresponds to a sum of an absolute value of each element in the vector in this encoding method; $\|\bullet\|_0$ represents a number of non-zero elements in a vector; U is the defect dictionary; $v_i$ is a weight vector corresponding to $x_i$; and a number p of $v_i$ constitute the feature encoding matrix V. The feature encoding matrix V enables Equation (7) to obtain a minimum value.

The constraint condition $\|v_i\|_0 = 1$ indicates that the elements in the vector $v_i$ can only have one non-zero value, $\|v_i\|_1 = 1$ indicates that the sum of the absolute values of the elements in the vector $v_i$ is 1, therefore, $\|v_i\|_0 = \|v_i\|_1 = 1$ limits the elements in the vector $v_i$ as follows: the absolute value of only one element is 1 and the absolute values of the rest elements are 0, which means that one low-level feature vector $x_i$ can only be quantified as one visual word to which an euclidean distance from the low-level feature vector is the minimum.

In addition, the present disclosure further provides an improved encoding method with respect to the above encoding method, which enables one low-level feature vector to correspond to a plurality of visual words during encoding, thus improving the recognition rate.

Specifically, the improved encoding method modifies the constraint conditions and removes the constraint conditions $\|v_i\|_0 = 1$, so that each low-level feature vector $x_i$ in the low-level feature of the defect region $X=[x_1, \ldots, x_p] \in R^{D \times p}$ does not have to correspond to only one visual word. At the same time, in order to prevent one low-level feature vector from corresponding to too many visual words, item $\lambda \|v_i\|_1$ are added to the Equation so that the sum of absolute values of each element of $v_i$ will not be too large.

In the improved encoding method, encoding the low-level feature of the defect region can be interpreted as: with respect to each low-level feature vector, assigning a appropriate weight to each base (corresponding to each visual word) of the defect dictionary (assigning the appropriate weight to some but not all bases if it is sparse encoding), so that the bases or some of the bases can represent the low-level feature vector correctly.

Encoding the low-level feature of the defect region $X=[x_1, \ldots, x_p]$ by using Equation (8) to obtain a corresponding feature encoding matrix V:

$$\min_{V} \sum_{i=1}^{p} \|x_i - Uv_i\|_2^2 + \lambda \|v_i\|_1 \qquad (8)$$

where, $\|\bullet\|_2^2$ represents a square of 2-norm of a vector or a matrix, and corresponds to a sum of a square of each element in the vector in this encoding method; $\|\bullet\|_1$ represents a 1-norm of a vector or a matrix, and corresponds to a sum of an absolute value of each element in the vector in this encoding method; p is a number of feature regions of a defect region; $x_i$ is a low-level feature vector of a single feature region i ($1 \le i \le p$) of a defect region; U is a defect dictionary matrix; $v_i$ is the weight vector corresponding to $x_i$, and a number p of $v_i$ constitute the feature encoding matrix V; $\lambda \|v_i\|_1$ is a constraint condition such that the sum of the absolute value of each element of $v_i$ will not be too large. The feature encoding matrix V enables Equation (8) to obtain a minimum value.

Optionally, Equation (8) can be solved by Orthogonal Matching Pursuit (OMP) algorithm to obtain the feature encoding matrix V, and the solution method is as follows.

The algorithm takes the defect dictionary matrix $U \in R^{D \times y}$, a single sample $x_i \in R^{D \times 1}$ (the low-level feature vector of a single feature region i ($1 \le i \le p$) of the defect region), and a sparsity K as inputs, and outputs the feature encoding matrix V, where y is a number of visual words in the defect dictionary, and each column vector $U_i \in R^{D \times 1}$ in the defect dictionary matrix corresponds to one visual word, and each vector $v_i$ in feature encoding matrix V is a sparse representation coefficient vector (or weight vector) for the single sample $x_i$.

At the same time, in order to make it easier to be understood, each variable in the following solution process is explained as follows:

$r_t$ represents residual, t represents a number of times of iterations, $\emptyset$ represents an empty set, $A_t$ represents a set of indexes (column numbers) of the t-th iteration, $\lambda_t$ represents a column number found in the t-th iteration, $u_j$ represents the j-th column of the defect dictionary matrix U, $U_{ct}$ represents a set of the selected columns of the defect dictionary matrix U by index $A_t$ (the set of the selected columns $U_{ct}$ being a matrix with a size of D*t, D is a dimension of a feature space), $v_t$ is a column vector with a size of t×1, $\cup$ represents a join operation of at least two sets, and $<\bullet>$ represents an inner product operation of vectors.

The solution process is as follows:

(1) initialization: residual $r_0 = x_i$, the set of indexes $A_0 = \emptyset$, $U_{c0} = \emptyset$, t=1;

(2) identifying index $\lambda_t$: identifying the corner mark corresponding to a maximum inner product of the residual r and atoms ($U_i$) (that is, bases or visual words) in the defect dictionary matrix U:

$$\lambda_t = \arg\max_{j=1,2,\ldots,y} |\langle r_{t-1}, u_j \rangle| \qquad (9)$$

(3) updating the set of indexes:

$$A_t = A_{t-1} \cup \{\lambda_t\} \qquad (10)$$

(4) recording the reconstructed set of atoms in the defect dictionary identified by the set of indexes:

$$U_{ct} = [U_{c(t-1)}, u_{\lambda_t}] \quad (11)$$

(5) finding the least square solution of $x_i = U_{ct}v_t$:

$$\hat{v}_t = \arg\min \|x_i - U_{ct}v_t\|_2 \quad (12)$$

(6) updating residual:

$$r_{t-1} = x_i - U_{ct}\hat{v}_t \quad (13)$$

(7) performing t=t+1; and if t≤K, returning to step (2), and if t>K, stopping iteration and proceeding to step (8);

(8) taking the reconstructed $v_i'$ as the sparse representation coefficient vector $v_i$ for the single sample $x_i$, in which the reconstructed $v_i'$ has non-zero terms at the elements of rows corresponding to $A_t$ and has zero term at the elements of the rest rows (a number of the rows of $v_i'$ is equal to that of $v_i$, which is equal to D), the values of the non-zero terms are sequentially the values of elements in $\hat{v}_t$ obtained from the last iteration;

(9) respectively performing the above-mentioned solution process for the number p of $x_i$, because the low-level feature of the defect region are represented as $X=[x_1, \ldots, x_p] \in R^{D \times p}$, and constituting the feature encoding matrix V including the obtained number p of $v_i$ as outputs.

Figure 4:
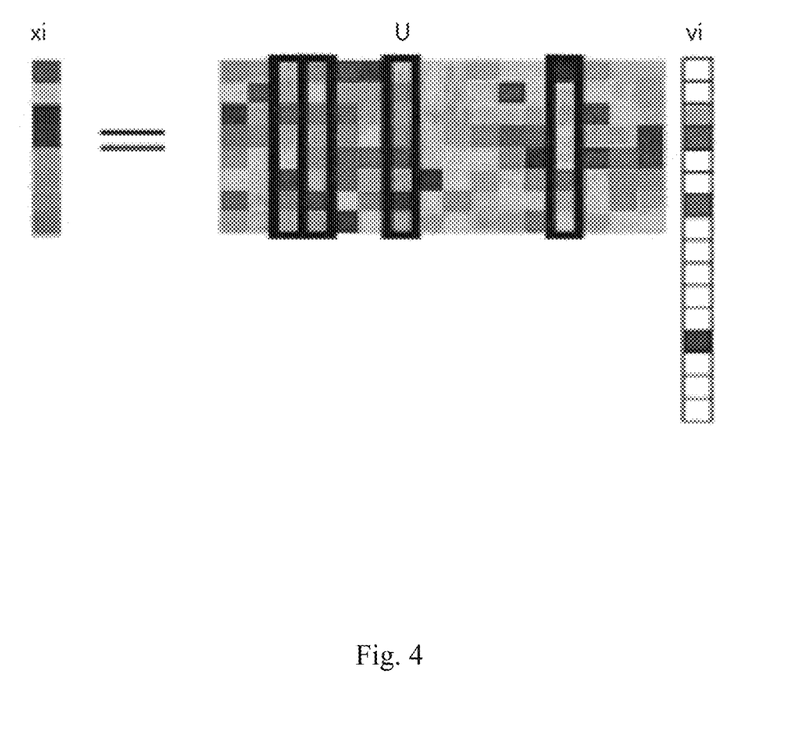
FIG. 4 shows a schematic diagram of a relationship between a low-level feature vector and its corresponding vector in a feature encoding matrix according to an embodiment of the present disclosure.

In the step (8), for example, as to the single sample $x_i$, if all the iterations are completed and the solution process determines that the vectors (atoms, or visual words) of column 3, column 4, column 7 and column 13 in the defect dictionary U (known from the final set of indexes $A_K$) are combined to obtain the single sample $x_i$, and corresponding non-zero term coefficients of the vectors of column 3, column 4, column 7 and column 13 in the defect dictionary U are obtained (according to the $\hat{v}_K$ obtained in the last iteration), element of row 3, element of row 4, element of row 7, and element of row 13 of the sparse representation coefficient vector $v_i$ for the single sample $x_i$ are sequentially the obtained non-zero term coefficients, and the elements of the rest rows are 0, as shown in FIG. 4. Although an example is given here with a smaller sparsity K to facilitate understanding of the present disclosure, those skilled in the art will understand that any other suitable K can be selected according to the actual situations.

Note that, the orthogonal matching pursuit (OMP) algorithm is illustrated to solve Equation (2) as an example, and those skilled in the art can also use other algorithms to solve it, for example, convex optimization algorithm and matching pursuit algorithm are also feasible.

In other words, any vector $x_i$ in the low-level feature $X=[x_1, \ldots, x_p] \in R^{D \times p}$ of the defect region can be combined by several vectors in the defect dictionary U. In addition, assuming that the defect dictionary U includes number y of vectors, each vector $U_i$ corresponds to a visual word in the defect dictionary U, $U_i \in R^{D \times 1}$. For each value ($v_{i1}$, $v_{i2}$, $v_{i3}$, ..., or $v_{iy}$) in the vector $v_i \in R^{y \times 1}$ corresponding to any vector $x_i$, if $v_{i1}$ is not 0, it means that the visual word corresponding to $U_1$ appears at the feature region (block) i represented by $x_i$; if it is 0, it means that the visual word corresponding to $U_1$ does not appear at the feature region i represented by $x_i$. Therefore, in the same way, the defect dictionary can be used to encode the low-level feature (e.g., HOG feature) of the defect region in the defect image.

Optionally, according to the feature encoding matrix V, the Bag-of-Words model of the defect region in the defect image, i.e., the middle-layer semantic feature, is obtained.

Specifically, a histogram of the visual words of the defect region in the defect image is:

$$M = [v_1 + v_2 + \ldots + v_p], \text{ where, } v_1, v_2, \ldots v_p \in R^{y \times 1}. \quad (14)$$

Each $v_i$ of the feature coding matrix V corresponding to the low-level feature of the defect region $X=[x_1, \ldots, x_p] \in R^{D \times p}$ is summed to obtain a vector $M \in R^{y \times 1}$. The value of the first row element of the vector M represents the number of times the visual word corresponding to $U_1$ appears in the defect region, the value of the second row element represents the number of times the visual word corresponding to $U_2$ appears in the defect region, and in this way, the number of times each visual word corresponding to each vector $U_i$ appears in the defect region can be known, and thus the Bag-of-Words model of the defect region can be known. That is, according to the histogram of the number of times each visual word appears in the defect region, the middle-level semantic feature represented by the Bag-of-Words model of the defect region is obtained.

In step 230, the defect in the defect region of the defect image is classified into one of the plurality of defect categories, based on the obtained middle layer semantic feature of the defect region in defect image.

Optionally, the obtained middle-level semantic feature of the defect region in the defect image is input into a trained classifier for classification.

Optionally, the classifier is a support vector machine (SVM) classifier.

By adopting the method for defect classification as described above, the problem that the low-level feature of the defect region (where a defect of any predetermined defect category exists) would vary greatly due to factors such as camera parameters, shooting methods, and shooting environment is solved, and the generation of the visual dictionary and the feature encoding method in the process of obtaining the middle-level semantic feature are improved: the low-level feature of the defect region is encoded by simultaneously applying the defect intra-category dictionary and the defect inter-category dictionary, wherein the defect intra-category dictionary corresponds to the low-level features specific to each defect category, and the defect inter-category dictionary corresponds to the low-level features that all defect categories have in common, which improves the distinguishable ability among the middle-level semantic features of these different categories of defects; and the situation that one low-level feature vector can only be quantized into one visual word during encoding is changed, thereby improving the overall recognition rate and realizing the screen defect image classification with high accuracy and high robustness.

Figure 5:
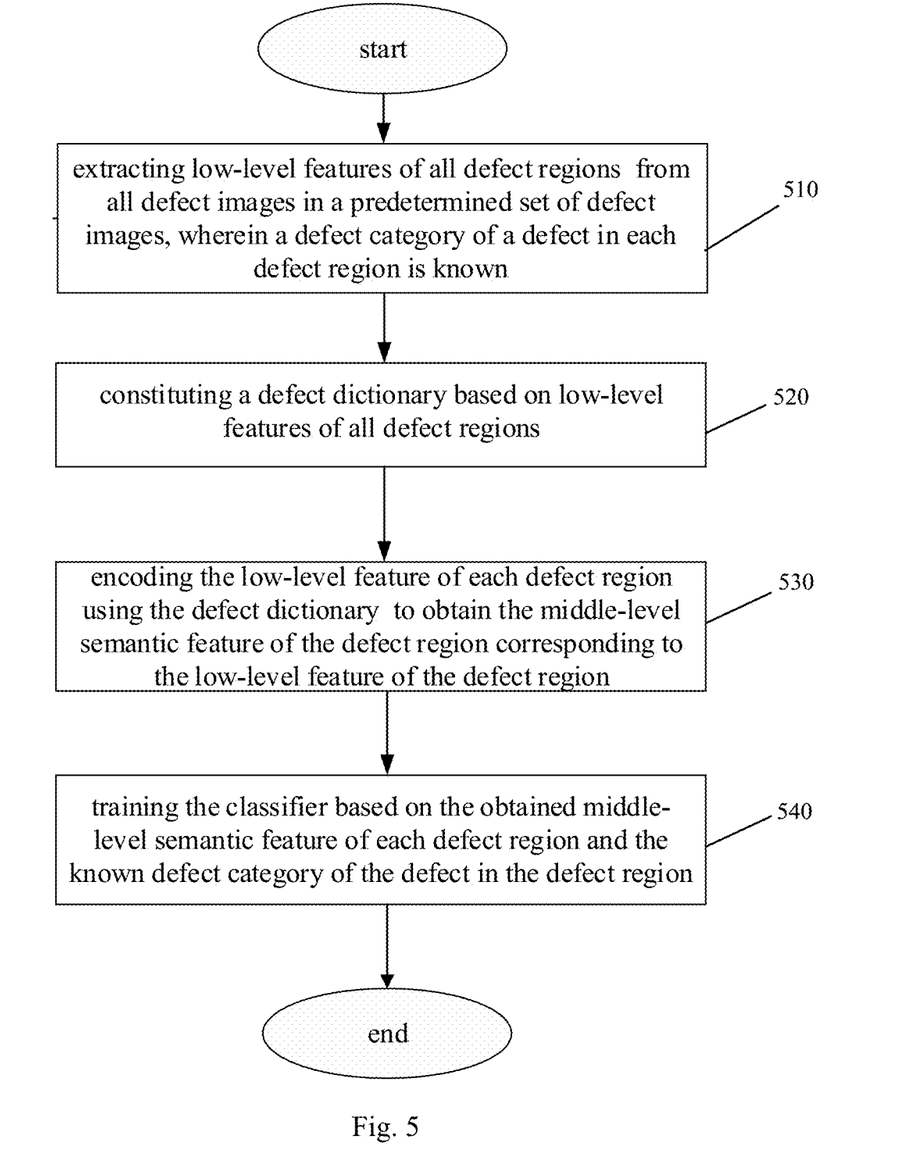
FIG. 5 shows a flowchart of a method for training a defect classifier according to an embodiment of the present disclosure.
Figure 6:
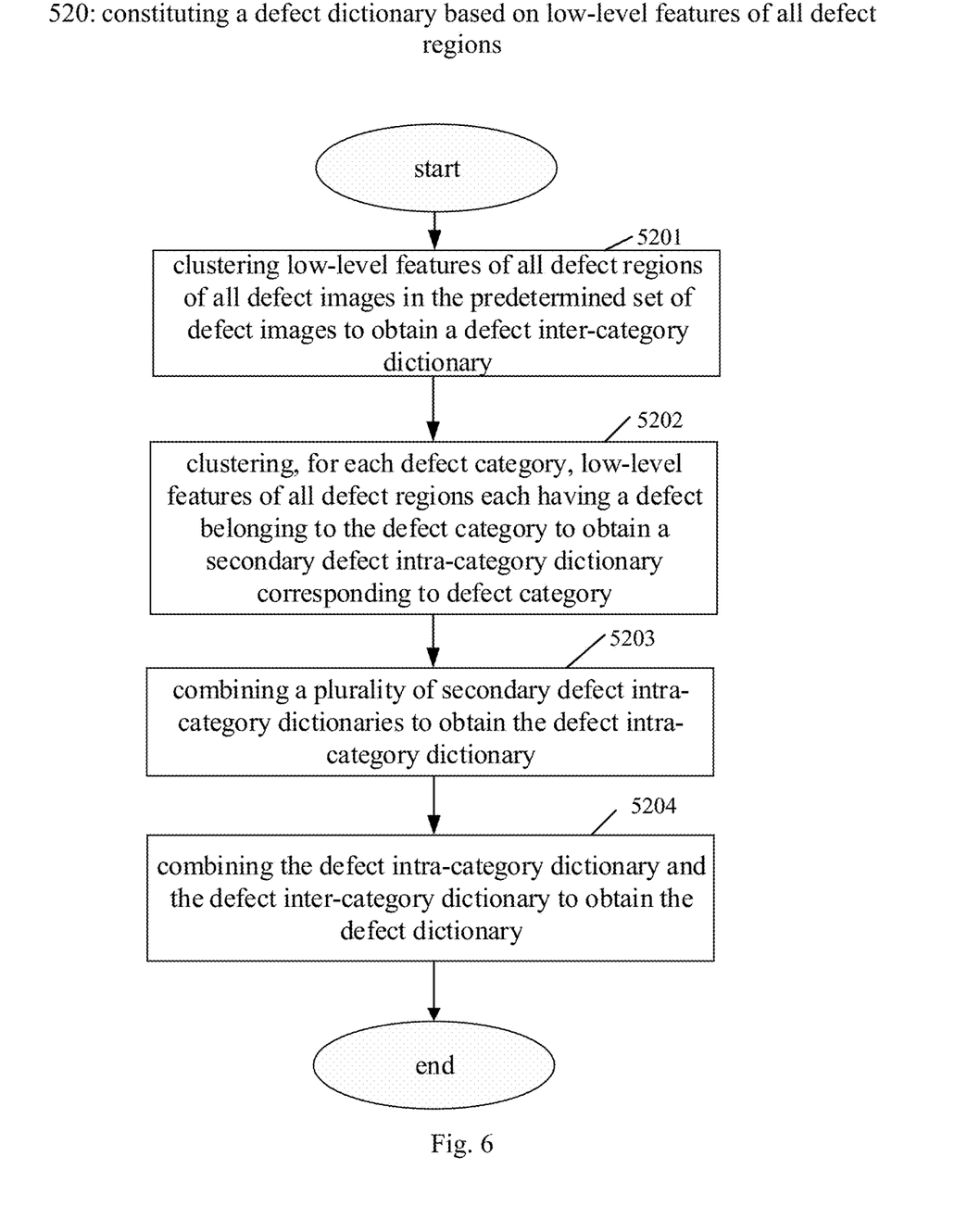
FIG. 6 shows a flowchart of a method for constituting a defect dictionary according to an embodiment of the present disclosure.

The method for training a defect classifier will be described below with reference to FIGS. 5-6. FIG. 5 shows a flowchart of a method 300 for training a defect classifier according to an embodiment of the present disclosure, and FIG. 6 shows a flowchart of specific steps for constituting a defect dictionary.

In step 510, low-level features of all defect regions are extracted from all defect images in a predetermined set of defect images, wherein a defect category of a defect in each defect region is known.

Optionally, the step of extracting low-level features of all defect regions in step 510 is similar to that in step 210 in the method for defect classification described with reference to FIG. 2, and thus the specific description of extracting low-level features of all defect regions is omitted here.

Optionally, the predetermined set of defect images is used to train a classifier.

In step 520, a defect dictionary is constituted based on low-level features of all defect regions. The defect dictionary comprises a defect intra-category dictionary and a defect inter-category dictionary. The defect intra-category dictionary includes a plurality of secondary defect intra-category dictionaries each respectively corresponding to one of a plurality of defect categories, and each secondary defect intra-category dictionary is directed to low-level features specific to its corresponding defect category; and the defect inter-category dictionary is directed to low-level features that the plurality of defect categories have in common.

Optionally, as shown in FIG. 6, constituting the defect dictionary includes the following sub-steps.

In step 5201, low-level features of all defect regions of all defect images in the predetermined set of defect images are clustered to obtain a defect inter-category dictionary $U_{d0}$. Optionally, a number of clustering centers is set to $k_1$, at this time, the defect inter-category dictionary $U_{d0}$ includes a number $k_1$ of visual words.

In step 5202, for each defect category, low-level features of all defect regions each having a defect belonging to the defect category in all defect images in the predetermined set of defect images are clustered to obtain a secondary defect intra-category dictionary corresponding to the defect category. Optionally, the number of cluster centers is set to $k_2$. Meanwhile, assuming that the number of defect categories is n, each secondary defect intra-category dictionary corresponding to a defect category is denoted as $U_{dk}$, $k=1, \ldots, n$, and each secondary defect intra-category dictionary $U_{dk}$ includes a number $k_2$ of visual words.

In step 5203, a plurality of secondary defect intra-category dictionaries $U_{dk}$ each respectively corresponding to a defect category are combined to obtain the defect intra-category dictionary $[U_{d1}, U_{d2}, \ldots, U_{dn}]$.

In step 5204, the defect dictionary $U=[U_{d1}, U_{d2}, \ldots U_{dn}, U_{d0}]$ is obtained by combining the defect intra-category dictionary and the defect inter-category dictionary. Obviously, the defect dictionary U includes a number $k_1+nk_2$ of visual words.

In step 530, the low-level feature of each defect region is encoded using the defect dictionary U to obtain the middle-level semantic feature of the defect region corresponding to the low-level feature of the defect region.

The encoding of the low-level feature of each defect region using the defect dictionary U is similar to that in step 220, and the detailed description of the encoding method is also omitted here.

In step 540, the classifier is trained based on the obtained middle-level semantic feature of each defect region and the known defect category of the defect in the defect region.

Optionally, the middle layer semantic feature of each defect region and the known defect category of the defect in the defect region are taken as inputs of a classifier to continuously optimize the parameters of the classifier.

Optionally, the classifier can be a SVM classifier, and the classical one-to-many method can be adopted to realize multi-category classification.

Figure 7:
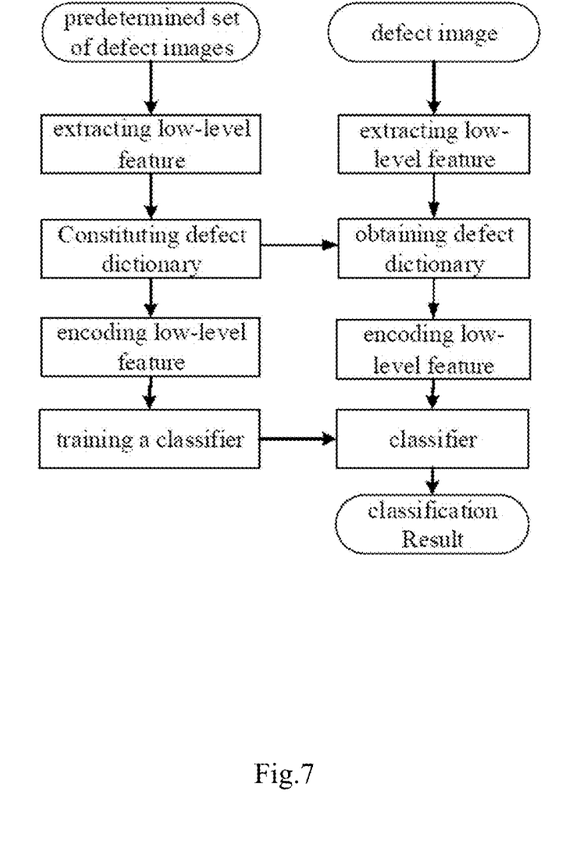
FIG. 7 is a flowchart of a method which combines a method for training a defect classifier with a method for defect classification according to an embodiment of the present disclosure.

The embodiments of the present disclosure have been described above with respect to the method for defect classification and the method for training defect classifier, respectively. However, those skilled in the art should understand that the two methods can be easily combined, as shown in FIG. 7. That is, the classifier is firstly trained with a predetermined set of defect images including defects of known defect categories. During the training stage, low-level features of all defect regions (regions where the defects exist) of all defect images in the predetermined set of defect images are extracted, a defect dictionary (including a defect inter-category dictionary and a defect intra-category dictionary as described above) is constituted based on low-level features of all defect regions of all defect images in the predetermined set of defect images, the low-level feature of each defect region is encoded by using the defect dictionary to obtain its corresponding middle-level semantic feature, and a classification model (i.e. classifier) is trained by using each middle-level semantic feature corresponding to the low-level feature of a defect region and the known defect category of the defect in the defect region. When another defect image is newly obtained and there is a need to classify a defect in this defect image into one of defect categories, the low-level feature of the defect region (the region where the defect exists) of the defect image is extracted first, the middle-level semantic feature of the defect region is obtained by encoding the low-level feature of the defect region based on the defect dictionary constituted in the training stage, and then the defect in the defect region of the newly obtained defect image is classified using the trained classifier (the classification model) based on the middle-level semantic feature of the defect region.

Figure 8:
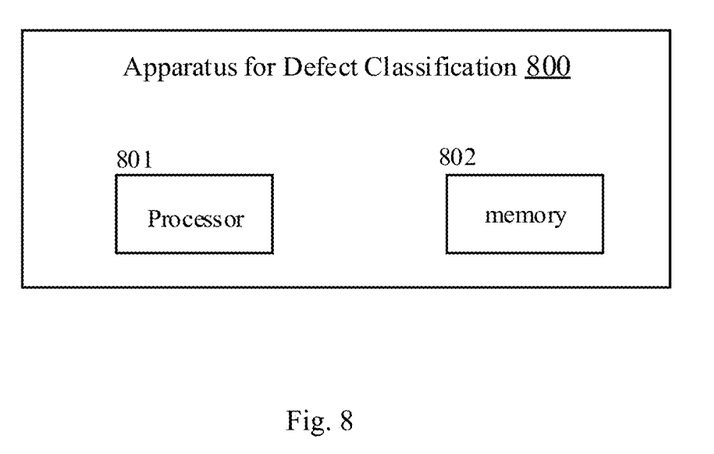
FIG. 8 shows a block diagram of an apparatus for defect classification according to an embodiment of the present disclosure.

An apparatus for defect classification according to an embodiment of the present disclosure will be described below with reference to FIG. 8. FIG. 8 is a block diagram of an apparatus for defect classification according to an embodiment of the present disclosure.

As shown in FIG. 8, the apparatus 800 for defect classification includes a processor 801 and a memory 802. It should be noted that although the apparatus for defect classification is illustrated to include only 2 components in FIG. 8, it is only exemplary and the apparatus for defect classification may also include one or more other components.

In FIG. 8, a memory 802 is used to store computer-executable instructions that, when executed by a processor, cause the processor to perform various steps of the method for defect classification as previously described.

The method comprises: extracting a low-level feature of a defect region from a defect image; encoding the low-level feature by using a defect dictionary to obtain a middle-level semantic feature corresponding to the low-level feature; classifying a defect in the defect region of the defect image into one of a plurality of defect categories based on the middle-level semantic feature, wherein the defect dictionary includes a defect intra-category dictionary and a defect inter-category dictionary.

Optionally, the defect intra-category dictionary includes a plurality of secondary defect intra-category dictionaries each respectively corresponding to one of the plurality of defect categories, and each secondary defect intra-category dictionary is directed to low-level features specific to its corresponding defect category; and the defect inter-category dictionary is directed to low-level features that the plurality of defect categories have in common.

Optionally, the defect inter-category dictionary is obtained by clustering low-level features of all defect regions of all defect images in a predetermined set of defect images; each secondary defect intra-category dictionary is obtained by clustering low-level features of all defect regions, each having a defect belonging to the defect category corresponding to the secondary defect intra-category dictionary, in all defect images in the predetermined set of defect images; the defect intra-category dictionary is obtained by combining the plurality of secondary defect intra-category dictionaries; and the defect dictionary is obtained by combining the defect inter-category dictionary and the defect intra-category dictionary.

Optionally, the extracting low-level features of the defect region from the defect image comprises: performing an image segmentation on the defect image to extract the defect region; and extracting the low-level feature of the defect region.

Optionally, the low-level feature includes: a Histogram of Oriented Gradient feature, a Scale-invariant Feature Transform feature, or a Speed-up Robust feature.

Optionally, the encoding the low-level feature by using the defect dictionary to obtain the middle-level semantic feature corresponding to the low-level feature comprises: encoding the low-level feature, by using the following formula, based on the defect dictionary, to obtain a feature encoding matrix corresponding to the low-level feature:

$$\min_V \sum_{i=1}^{p} \|x_i - Uv_i\|_2^2 + \lambda \|v_i\|_1$$

where, V represents the feature encoding matrix, $\|\cdot\|_2^2$ represents a square of 2-norm of a vector and corresponds to a sum of a square of each element in the vector; $\|\cdot\|_1$ represents a 1-norm of a vector and corresponds to a sum of an absolute value of each element in the vector; p is a number of feature regions of the defect region; $x_i$ is a low-level feature vector of a single feature region i ($1 \le i \le p$) of the defect region; U is a matrix of the defect dictionary; $v_i$ is a weight vector corresponding to $x_i$, and a number p of $v_i$ constitute the feature encoding matrix V; $\lambda \|v_i\|_1$ is a constraint condition such that the sum of the absolute value of each element in the vector $v_i$ will not be too large; and obtaining the middle-level semantic feature based on the feature encoding matrix, wherein, the feature encoding matrix V enables a minimum value of the above formula.

Optionally, the middle-level semantic feature includes a Bag-of-Words model, and the encoding the low-level feature by using the defect dictionary to obtain the middle-level semantic feature corresponding to the low-level feature further comprises: obtaining the Bag-of-Words model of the defect region according to the feature encoding matrix V.

Optionally, the plurality of defect categories include: dark spot, bright spot, scratch, glass breakage, liquid leakage, and poor film, and the classifying the defect in the defect region of the defect image into one of the plurality of defect categories comprises: classifying the defect in the defect region of the defect image into one of dark spot, bright spot, scratch, glass breakage, liquid leakage, and poor film.

Optionally, the classifying the defect in the defect region of the defect image into one of the plurality of defect categories based on the middle-level semantic features comprises: inputting the obtained middle-level semantic feature of the defect region of the defect image into a trained classifier for classification.

Figure 9:
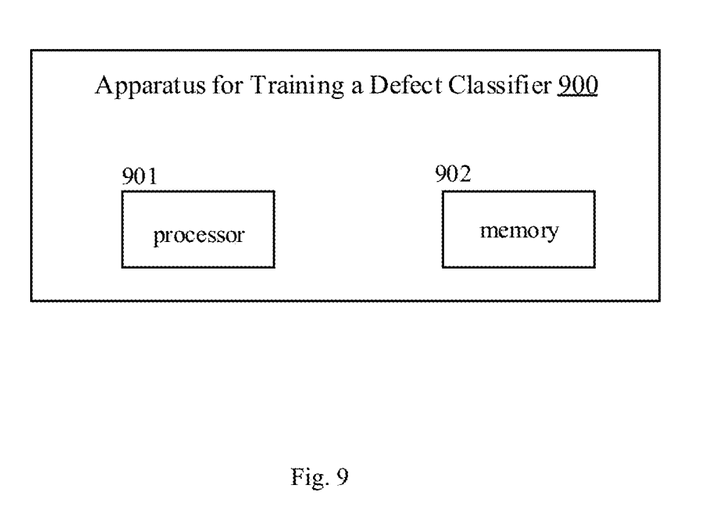
FIG. 9 shows a block diagram of an apparatus for training defect classifier according to an embodiment of the present disclosure.

Next, an apparatus for training defect classifier according to an embodiment of the present disclosure will be described with reference to FIG. 9. FIG. 9 is a block diagram of an apparatus for training defect classifier according to an embodiment of the present disclosure.

As shown in FIG. 9, an apparatus 900 for training defect classifier includes a processor 901 and a memory 902. It should be noted that although the apparatus for training defect classifier is illustrated to include only 2 components in FIG. 9, it is only exemplary and the apparatus for training defect classifier may also include one or more other components.

In FIG. 9, the memory 902 is used to store computer-executable instructions that, when executed by a processor, cause the processor to perform various steps of the method for training defect classifier as previously described.

The method comprises: extracting low-level features of all defect regions from all defect images in a predetermined set of defect images, wherein a defect category of a defect in each defect region is known; constituting a defect dictionary based on low-level features of all defect regions; encoding a low-level feature of each defect region by using the defect dictionary, to obtain a middle-level semantic feature of the defect region corresponding to the low-level feature of the defect region; and training the classifier based on the obtained middle-level semantic feature of each defect region and the defect category of the defect in the defect region, wherein the defect dictionary comprises a defect intra-category dictionary and a defect inter-category dictionary.

Optionally, the defect intra-category dictionary includes a plurality of secondary defect intra-category dictionaries each respectively corresponding to one of a plurality of defect categories, and each secondary defect intra-category dictionary is directed to low-level features specific to its corresponding defect category; and the defect inter-category dictionary is directed to low-level features that the plurality of defect categories have in common.

Optionally, the constituting the defect dictionary based on low-level features of all defect regions comprises: clustering low-level features of all defect regions of all defect images in the predetermined set of defect images to obtain the defect inter-category dictionary; for each defect category, clustering low-level features of all defect regions each having a defect belonging to the defect category in all defect images in the predetermined set of defect images, to obtain a corresponding secondary defect intra-category dictionary; combining a plurality of secondary defect intra-category dictionaries to obtain defect intra-category dictionaries; and combining the defect inter-category dictionary and the defect intra-category dictionary to obtain the defect dictionary.

Optionally, the extracting low-level features of the defect region from each defect image in a predetermined set of defect images comprises: for each defect image: performing an image segmentation on the defect image to extract a defect region; and extracting the low-level feature of the defect region.

Optionally, the defect category includes: dark spot, bright spot, scratch, glass breakage, liquid leakage, or poor film.

In embodiments of the present disclosure, the processor 801 or 901 may be configured to execute code or instructions to perform the operations and functions described herein, as well as to perform calculations and generate commands. The processor 801 or 901 may be a general purpose processor, a special purpose processor, a processor core, a multiprocessor, a reconfigurable processor, or any combination thereof. Processor 801 or 901 may be a single processing unit, multiple processing units, a single processing core, multiple processing cores, dedicated processing cores, coprocessors, or any combination thereof. According to some embodiments, processor 801 or 901 may be a virtualized computing machine executing within one or more other computing machines.

The memory 802 or 902 may include non-volatile memory such as read only memory (ROM), programmable read only memory (PROM), erasable programmable read only memory (EPROM), flash memory, or any other device capable of storing program instructions or data with or without application of power. The memory 802 or 902 may also include volatile memory such as random access memory (RAM), static random access memory (SRAM), dynamic random access memory (DRAM), and synchronous dynamic random access memory (SDRAM). Memory 802 or 902 may be implemented using a single memory module or multiple memory modules. Although memory 802 and 902 are described as part of the apparatus for defect classification device and the training apparatus for defect classification, respectively, those skilled in the art will recognize that the memory 802 or 902 may be separate from the apparatus for defect classification device and the training apparatus for defect classification without departing from the scope of the present disclosure.

Although present disclosure has been described in detail with respect to various specific exemplary embodiments, each exemplary embodiment is provided by way of explanation rather than limitation of the present disclosure. Those skilled in the art can easily make modifications, variations to these embodiments and/or obtain equivalents of these embodiments after understanding the above contents. Therefore, the present disclosure does not exclude including such modifications, variations and/or additions to the present disclosure as will be apparent to those of ordinary skill in the Art. For example, features illustrated or described as part of one embodiment may be used with another embodiment to produce yet another embodiment. Therefore, it is intended that the present disclosure covers such modifications, variations, and equivalents.

Specifically, although the drawings of the present disclosure respectively describe steps performed in a specific order for purposes of illustration and discussion, methods of the present disclosure are not limited to the illustrated specific order. The various steps of the above methods may be omitted, rearranged, combined, and/or adjusted in any manner without departing from the scope of the present disclosure.

Those skilled in the art can understand that various aspects of the present disclosure can be illustrated and described through several patentable categories or situations, including any combination of new and useful processes, machines, products or substances, or any new and useful improvements to them. Accordingly, various aspects of the present disclosure may be completely executed by hardware, may be completely executed by software (including firmware, resident software, microcode, etc.), or may be executed by a combination of hardware and software. The above hardware or software can be referred to as "data block", "module", "engine", "unit", "component", or "system". Furthermore, aspects of the present disclosure may appear as a computer product located in one or more computer readable media, the computer product including computer readable program code.

Unless otherwise defined, all terms (including technical and scientific terms) used herein have the same meaning as commonly understood by one of ordinary skill in the art to which this disclosure belongs. It should also be understood that terms such as those defined in a general dictionary should be interpreted to have a meaning consistent with their meaning in the context of the related art, and should not be interpreted in an idealized or extremely formalized meaning unless explicitly defined so herein.

The above description is an explanation of the present disclosure and should not be considered as a limitation thereof. Although several exemplary embodiments of the present disclosure have been described, those skilled in the art will readily appreciate that many modifications can be made to the exemplary embodiments without departing from the novel teachings and advantages of the present disclosure. Therefore, all such modifications are intended to be included within the scope of this disclosure as defined by the claims. It should be understood that the above description is an explanation of the present disclosure and should not be considered as limited to the specific embodiments disclosed, and modifications to the disclosed embodiments and other embodiments are intended to be included within the scope of the appended claims. The present disclosure is defined by the claims and their equivalents.

The present disclosure claims priority to Chinese patent application No. 201910670824.2 filed on Jul. 24, 2019, the disclosure of which is incorporated herein by reference in its entirety as part of the present disclosure.

What is claimed is:

1. A method for defect classification, comprising:
   extracting a low-level feature of a defect region from a defect image;
   encoding the low-level feature by using a defect dictionary to obtain a middle-level semantic feature corresponding to the low-level feature; and
   classifying a defect in the defect region into one of a plurality of defect categories based on the middle-level semantic feature,
   wherein the defect dictionary includes a defect intra-category dictionary and a defect inter-category dictionary,
   the defect intra-category dictionary includes a plurality of secondary defect intra-category dictionaries each respectively corresponding to one of the plurality of defect categories, and each secondary defect intra-category dictionary is directed to low-level features specific to its corresponding defect category, and
   the defect inter-category dictionary is directed to low-level features that the plurality of defect categories have in common.

2. The method according to claim 1, wherein,
   the defect inter-category dictionary is obtained by clustering low-level features of all defect regions of all defect images in a predetermined set of defect images;
   each secondary defect intra-category dictionary is obtained by clustering low-level features of all defect regions, each having a defect belonging to a defect category corresponding to the secondary defect intra-category dictionary, in all defect images in the predetermined set of defect images;
   the defect intra-category dictionary is obtained by combining the plurality of secondary defect intra-category dictionaries; and
   the defect dictionary is obtained by combining the defect inter-category dictionary and the defect intra-category dictionary.

3. The method according to claim 1, wherein the extracting the low-level feature of the defect region from the defect image comprises:
   performing an image segmentation on the defect image to extract the defect region; and
   extracting the low-level feature of the defect region.

4. The method according to claim 1, wherein the low-level feature includes: a Histogram of Oriented Gradient feature, a Scale-invariant Feature Transform feature, or a Speed-up Robust feature.

5. The method according to claim 1, wherein the encoding the low-level feature by using the defect dictionary to obtain the middle-level semantic feature corresponding to the low-level feature comprises:
encoding the low-level feature, by using the following formula, based on the defect dictionary, to obtain a feature encoding matrix corresponding to the low-level feature:

$$\min_{V} \sum_{i=1}^{p} \|x_i - Uv_i\|_2^2 + \lambda \|v_i\|_1$$

wherein, V represents the feature encoding matrix; $\|\cdot\|_2^2$ represents a square of 2-norm of a vector, and corresponds to a sum of a square of each element in the vector; $\|\cdot\|_1$ represents a 1-norm of a vector, and corresponds to a sum of an absolute value of each element in the vector; p is a number of feature regions of the defect region; $x_i$ is a low-level feature vector of a single feature region i ($1 \leq i \leq p$) of the defect region; U is a defect dictionary matrix; $v_i$ is a weight vector corresponding to $x_i$, and a number p of $v_i$ constitute the feature encoding matrix V; $\lambda \|v_i\|_1$ is a constraint condition such that the sum of the absolute value of each element in the vector $v_i$ will not be too large; and
obtaining the middle-level semantic feature based on the feature encoding matrix,
wherein, the feature encoding matrix V enables a minimum value of the formula.

6. The method according to claim 5, wherein the middle-level semantic feature includes a Bag-of-Words model, and the encoding the low-level feature by using the defect dictionary to obtain the middle-level semantic feature corresponding to the low-level feature further comprises:
obtaining the Bag-of-Words model of the defect region according to the feature encoding matrix V.

7. The method according to claim 1, wherein the plurality of defect categories include: dark spot, bright spot, scratch, glass breakage, liquid leakage, and poor film,
the classifying the defect in the defect region into one of the plurality of defect categories comprises: classifying the defect in the defect region into one of dark spot, bright spot, scratch, glass breakage, liquid leakage, and poor film.

8. The method according to claim 1, wherein the classifying the defect in the defect region into one of the plurality of defect categories based on the middle-level semantic feature comprises:
inputting the obtained middle-level semantic feature of the defect region into a trained classifier for classification.

9. An apparatus for defect classification, comprising:
a processor; and
a memory for storing computer-executable instructions that, when executed by the processor, cause the processor to perform the method for defect classification according to claim 1.

10. A method for training a defect classifier, comprising:
extracting low-level features of all defect regions from all defect images in a predetermined set of defect images, wherein a defect category of a defect in each defect region is known;
constituting a defect dictionary based on low-level features of all defect regions;
encoding a low-level feature of each defect region by using the defect dictionary, to obtain a middle-level semantic feature of the defect region corresponding to the low-level feature of the defect region; and
training the defect classifier based on the obtained middle-level semantic feature of each defect region and the known defect category of the defect in the defect region,
wherein the defect dictionary comprises a defect intra-category dictionary and a defect inter-category dictionary,
the defect intra-category dictionary includes a plurality of secondary defect intra-category dictionaries each respectively corresponding to one of a plurality of defect categories, and each secondary defect intra-category dictionary is directed to low-level features specific to its corresponding defect category, and
the defect inter-category dictionary is directed to low-level features that the plurality of defect categories have in common.

11. The method according to claim 10, wherein the constituting the defect dictionary based on low-level features of all defect regions comprises:
clustering low-level features of all defect regions of all defect images in the predetermined set of defect images to obtain the defect inter-category dictionary;
for each defect category, clustering low-level features of all defect regions each having a defect belonging to the defect category in all defect images in the predetermined set of defect images, to obtain a corresponding secondary defect intra-category dictionary;
combining the plurality of secondary defect intra-category dictionaries to obtain the defect intra-category dictionary; and
combining the defect inter-category dictionary and the defect intra-category dictionary to obtain the defect dictionary.

12. The method according to claim 10, wherein the extracting the low-level features of all defect regions from all defect images in the predetermined set of defect images comprises: for each defect image,
performing an image segmentation on the defect image to extract a defect region; and
extracting the low-level feature of the defect region.

13. The method according to claim 10, wherein the defect category includes:
dark spot, bright spot, scratch, glass breakage, liquid leakage, or poor film.

14. An apparatus for training a defect classifier, comprising:
a processor; and
a memory for storing computer-executable instructions that, when executed by the processor, cause the processor to perform the method for training a defect classifier according to claim 10.

* * * * *